(12) United States Patent
Schwalbe et al.

(10) Patent No.: US 10,377,423 B2
(45) Date of Patent: Aug. 13, 2019

(54) MULTIPLE SYSTEM SUPPORT ARRANGEMENT FOR ENGINE COMPARTMENT

(71) Applicant: CNH Industrial America LLC, New Holland, PA (US)

(72) Inventors: Blaine Schwalbe, Valders, WI (US); Lawrence R. Borucki, Jr., Oostburg, WI (US)

(73) Assignee: CNH Industrial America LLC, New Holland, PA (US)

( * ) Notice: Subject to any disclaimer, the term of this patent is extended or adjusted under 35 U.S.C. 154(b) by 52 days.

(21) Appl. No.: 15/678,248

(22) Filed: Aug. 16, 2017

(65) Prior Publication Data
US 2019/0054959 A1 Feb. 21, 2019

(51) Int. Cl.
| | |
|---|---|
| *B62D 25/08* | (2006.01) |
| *B62D 49/00* | (2006.01) |
| *B23K 31/02* | (2006.01) |
| *B60P 3/30* | (2006.01) |
| *B23K 101/00* | (2006.01) |
| *B62D 53/08* | (2006.01) |

(Continued)

(52) U.S. Cl.
CPC ............ *B62D 25/082* (2013.01); *B23K 31/02* (2013.01); *B62D 25/084* (2013.01); *B62D 49/00* (2013.01); *B23K 2101/006* (2018.08); *B60D 1/488* (2013.01); *B60P 3/30* (2013.01); *B62D 21/02* (2013.01); *B62D 53/0807* (2013.01)

(58) Field of Classification Search
CPC .. B62D 53/0807; B62D 24/02; B62D 25/082; B62D 25/084; B62D 49/00; B62D 21/02; B60D 1/488; B23K 31/02
See application file for complete search history.

(56) References Cited

U.S. PATENT DOCUMENTS

| | | | |
|---|---|---|---|
| 2,875,746 A | 3/1959 | Brice et al. | |
| 3,517,765 A * | 6/1970 | Eggert, Jr. ............... | B60K 5/00 180/312 |
| 3,730,147 A | 5/1973 | Buchwald | |

(Continued)

FOREIGN PATENT DOCUMENTS

CN 203614224 U 5/2014

OTHER PUBLICATIONS

ARGO XTD 8X8 at http://www.argoadventure.com/ARGO-XTD-8X8_p_12808.html.

(Continued)

*Primary Examiner* — Karen Beck
(74) *Attorney, Agent, or Firm* — Rebecca L. Henkel; Rickard K. DeMille

(57) ABSTRACT

An engine compartment support arrangement for an agricultural machine includes first and second support rails disposed within an engine compartment, a horizontal platform disposed between the first and second support rails and coupled thereto, and a plurality of engine accessory mounts welded to at least one of the first support rail and the second support rail. The first support rail includes a horizontal portion and an angled portion, wherein a second end of the horizontal portion is aligned with a first end of the angled portion. The second support rail includes a horizontal portion and an angled portion, wherein a second end of the horizontal portion is aligned with a first end of the angled portion.

17 Claims, 7 Drawing Sheets

(51) Int. Cl.
*B62D 21/02* (2006.01)
*B60D 1/48* (2006.01)

(56) References Cited

U.S. PATENT DOCUMENTS

| | | | | |
|---|---|---|---|---|
| 4,697,782 | A | 10/1987 | Ban | |
| 5,125,376 | A | 6/1992 | Williams et al. | |
| 5,335,745 | A | 8/1994 | Goor | |
| 6,349,919 | B1 | 2/2002 | Zupan | |
| 6,402,229 | B1* | 6/2002 | Suganuma | B62D 21/02 180/311 |
| 7,144,039 | B2* | 12/2006 | Kawasaki | B60K 1/04 280/784 |
| 7,393,016 | B2* | 7/2008 | Mitsui | B62D 25/08 180/232 |
| 8,894,134 | B2* | 11/2014 | Tomozawa | B60K 5/00 180/291 |
| 9,010,479 | B2* | 4/2015 | Kambayashi | B60H 1/3223 180/291 |
| 9,453,327 | B2* | 9/2016 | Okamoto | E02F 9/0808 |
| 2004/0200659 | A1* | 10/2004 | Miyasaka | B62D 21/152 180/312 |
| 2007/0252412 | A1* | 11/2007 | Yatsuda | B62D 25/082 296/193.09 |
| 2008/0142289 | A1* | 6/2008 | Yang | B60K 1/04 180/299 |
| 2012/0212010 | A1* | 8/2012 | Tomozawa | B60K 5/00 296/203.02 |
| 2013/0069394 | A1* | 3/2013 | Homan | B62D 25/084 296/203.02 |
| 2014/0311842 | A1* | 10/2014 | Kambayashi | B60K 1/00 188/371 |
| 2017/0096169 | A1* | 4/2017 | Takeda | B62D 21/11 |
| 2017/0291643 | A1* | 10/2017 | Sakamoto | B62D 25/082 |
| 2018/0022387 | A1* | 1/2018 | Ta | B60K 1/00 180/291 |
| 2019/0023325 | A1* | 1/2019 | Schwalbe | B62D 25/12 |

OTHER PUBLICATIONS

Pil; Linking Product Variety to Order-Fulfillment Strategies at http://pubsonline.informs.org/doi/abs/10.1287/inte.1040.0092.

* cited by examiner

MULTIPLE SYSTEM SUPPORT ARRANGEMENT FOR ENGINE COMPARTMENT

FIELD OF THE INVENTION

The invention relates generally to agricultural product application equipment or agricultural machines such as self-propelled sprayers and, in particular, to a multiple system support arrangement having mounts integrally formed into the engine-supporting sub-frame to support the accessories and systems within the engine compartment.

BACKGROUND OF THE INVENTION

High-clearance sprayers are getting larger and more complex to allow for increasing coverage in a single pass, which improves application efficiency. These high-clearance sprayers require high horsepower engines with numerous engine driven accessories and system such as exhaust after-treatment systems (ATS) that need to be mounted near the engine.

Currently, the different accessories and systems are mounted to separate brackets that are individually connected to an engine-supporting sub-frame. Individually connecting the accessory or system support brackets to the frame takes time during assembly and requires inventorying the separate brackets. Connecting the components of some systems, such as ATS components can be particularly complicated because of the size and weight ATS components, which can present challenge when assembling in a sprayer chassis.

Therefore, it is desired to provide a support arrangement having a plurality of mounts integrally connected to the engine-supporting sub-frame within the engine compartment. Additionally, there is a desire to provide an ATS mounting platform for pre-assembly of the entire ATS system, which can be attached as a unit to the engine-supporting sub-frame.

SUMMARY OF THE INVENTION

The present invention is directed to a support arrangement for an engine compartment. The support arrangement includes mounts integrally connected to the engine-supporting sub-frame.

According to one aspect of the invention, an engine compartment support arrangement includes a first support rail disposed within an engine compartment, a second support rail disposed within an engine compartment, a horizontal platform disposed between the first and second support rails and coupled thereto, and a plurality of engine accessory mounts welded to at least one of the first support rail and the second support rail. The first support rail includes a horizontal portion having a first end and a second end, the first end aligned with a first end of the first support rail, and an angled portion having a first end and a second end, the first end aligned with the second end of the horizontal portion and the second end aligned with a second end of the first support rail. Similarly, the second support rail includes a horizontal portion having a first end and a second end, the first end aligned with a first end of the second support rail, and an angled portion having a first end and a second end, the first end aligned with the second end of the horizontal portion and the second end aligned with a second end of the second support rail.

According to another aspect of the invention, the first support rail includes a mounting flange extending downward from an inner surface of the first support rail. The mounting flange has a first end disposed between the first and second ends of the horizontal portion of the first support rail and a second end disposed between the first and second ends of the angled portion of the first support rail. The plurality of engine accessory mounts may include a fuse panel mount extending from a bottom edge of the mounting flange. The second support rail includes at least one panel mount extending from an outer surface of the second support rail at a respective location along at least one of the horizontal portion of the second support rail and the angled portion of the second support rail.

According to yet another aspect of the invention, the plurality of engine accessory mounts may include a de-aeration tank mount welded to a top surface of the first support rail and extending upward therefrom. The de-aeration tank mount has a first side disposed between the first and second ends of the horizontal portion of the first support rail and a second side disposed between the first and second ends of the angled portion of the first support rail.

According to another aspect of the invention, the plurality of engine accessory mounts may include an air filter mount welded to a top surface of the first support rail at a location between the first and second ends of the angled portion of the first support rail. The air filter mount extends from a first end aligned with the first support rail and a second end cantilevered out therefrom.

According to yet another aspect of the invention, the plurality of engine accessory mounts may include a radiator overflow mount having a first portion and a second portion. The first portion is oriented parallel to and welded to a top surface of the horizontal portion of the second support rail at a location between the first and second ends of the horizontal portion of the second support rail. The second portion extends upward from the top surface of the horizontal portion of the second support rail.

According to another aspect of the invention, the plurality of engine accessory mounts may include an air cooler mount having a first portion, a second portion, and a third portion. The first portion is oriented parallel to and coupled to an inner surface of the second support rail at a location between the first and second ends of the angled portion of the second support rail. The second portion extends inward from a first end aligned with a bottom edge of the first portion to a second end cantilevered therefrom. The third portion extends downward from the second end of the second portion.

According to yet another aspect of the invention, the plurality of engine accessory mounts may include a component mount having a first portion, a second portion, and a third portion. The first portion is oriented parallel to and coupled to a top surface of the angled portion of the second support rail at a location between the first and second ends of the angled portion of the second support rail. The second portion extends upward from a first end aligned with the first portion to a second end. The third portion extends inward from the second end of the second portion and being cantilevered therefrom.

According to another aspect of the invention, a method of manufacturing an engine compartment support arrangement includes providing a first support rail, providing a second support rail, disposing a platform between the first and second support rails at locations adjacent the second ends of the first and second support rails, welding a plurality of engine accessory mounts of the first support rail to the first support rail, and welding a plurality of engine accessory mounts of the second support rail to the second support rail.

The first support rail includes a first end and a second end, a horizontal portion having a first end aligned with the first end of the first support rail and a second end, and an angled portion having a first end aligned with the second end of the horizontal portion and a second end aligned with the second end of the first support rail. Similarly, the second support rail includes a first end and a second end, a horizontal portion having a first end aligned with the first end of the second support rail and a second end, and an angled portion having a first end aligned with the second end of the horizontal portion and a second end aligned with the second end of the second support rail.

According to yet another aspect of the invention, the method may also include welding a mounting flange to an inner surface of the first support rail and welding at least one panel mount to an outer surface of the second support rail at a respective location along at least one of the horizontal portion of the second support rail and the angled portion of the second support rail. The mounting flange extends downward from the first support rail. The mounting flange also includes a first end disposed between the first and second ends of the horizontal portion of the first support rail and a second end disposed between the first and second ends of the angled portion of the first support rail.

According to another aspect of the invention, welding a plurality of engine accessory mounts of the first support rail may include welding a first engine accessory mount to a top surface of the first support rail, welding a second engine accessory mount to the top surface of the first support rail at a location between the first and second ends of the angled portion of the first support rail, and welding a mounting flange to an inner surface of the first support rail. The first engine accessory mount extends upward from the top surface of the first support rail. The first engine accessory mount of the first support rail also has a first side disposed between the first and second ends of the horizontal portion of the first support rail and a second side disposed between the first and second ends of the angled portion of the first support rail. The second engine accessory mount of the first support rail extends from a first end aligned with the first support rail and a second end cantilevered out therefrom. The mounting flange includes a third engine accessory mount of the first support rail extending from a bottom edge of the mounting flange.

According to yet another aspect of the invention, welding a plurality of engine accessory mounts of the second rail to the second support rail may include welding a first portion of a first engine accessory mount to a top surface of the horizontal portion of the second support rail at a location between the first and second ends of the horizontal portion of the second support rail, welding a first portion of a second engine accessory mount to an inner surface of the second support rail at a location between the first and second ends of the angled portion of the second support rail, and welding a first portion of a third engine accessory mount to a top surface of the angled portion of the second support rail at a location between the first and second ends of the angled portion of the second support rail. The first engine accessory mount of the second support rail also includes a second portion extending upward from the top surface of the horizontal portion of the second support rail. The second engine accessory mount of the second support rail also include a second portion extending inward from a first end aligned with a bottom edge of the first portion to a second end cantilevered therefrom and a third portion extending downward from the second end of the second portion. The third engine accessory mount of the second support rail also includes a second portion extending upward from a first end aligned with the first portion to a second end and a third portion of the third engine accessory extending inward from the second end of the second portion and being cantilevered therefrom.

According to another aspect of the invention disposing a platform between the first and second support rails includes welding a first portion of a first platform mount to an inner surface of the first support rail at a location adjacent the second end of the angled portion of the first support rail and welding a first portion of a second platform mount to an inner surface of the second support rail at a location adjacent the second end of the angled portion of the second support rail. The first platform mount includes a second portion extending inward from the first portion and is cantilevered from the first support rail. The second platform mount includes a second portion extending inward from the first portion and is cantilevered from the second support rail. The method further includes coupling the horizontal platform to the second portions of the first and second platform mounts.

According to yet another aspect of the invention, a support arrangement for an engine compartment includes a first support rail, a second support rail, a platform disposed between and coupled to the first and second support rails at locations adjacent the second ends of the first and second support rails, a plurality of engine accessory mounts of the first support rail welded to the first support rail, and a plurality of engine accessory mounts of the second support rail welded to the second support rail. The first support rail includes a first end and a second end, a horizontal portion with a first end aligned with the first end of the first support rail and a second end, and an angled portion with a first end aligned with the second end of the horizontal portion and a second end aligned with the second end of the first support rail. The second support rail includes a first end and a second end, a horizontal portion with a first end aligned with the first end of the second support rail and a second end, and an angled portion with a first end aligned with the second end of the horizontal portion and a second end aligned with the second end of the second support rail.

According to another aspect of the invention, the plurality of engine accessory mounts of the first support rail includes a first engine accessory mount welded to a top surface of the first support rail, a second engine accessory mount welded to the top surface of the first support rail at a location between the first and second ends of the angled portion of the first support rail, and a third engine accessory mount extending from a bottom edge of a mounting flange, wherein the mounting flange is welded to an inner surface of the first support rail. The first engine accessory mount extends upward from the top surface of the first support rail, has a first side disposed between the first and second ends of the horizontal portion of the first support rail, and has a second side disposed between the first and second ends of the angled portion of the first support rail. The second engine accessory mount extends from a first end aligned with the first support rail and a second end cantilevered out therefrom.

According to yet another aspect of the invention, the plurality of engine accessory mounts of the second support rail includes a first engine accessory mount having a first portion welded to a top surface of the horizontal portion of the second support rail at a location between the first and second ends of the horizontal portion of the second support rail, a second engine accessory mount having a first portion welded to an inner surface of the second support rail at a location between the first and second ends of the angled portion of the second support rail. The first engine accessory mount of the second support rail also includes a second portion extending upward from the top surface of the horizontal portion of the second support rail. The second engine accessory mount of the second support rail also includes a second portion extending inward from a first end aligned with a bottom edge of the first portion to a second end cantilevered therefrom and a third portion extending downward from the second end of the second portion. The third engine accessory mount also includes a second portion extending upward from a first end aligned with the first portion to a second end and a third portion extending inward from the second end of the second portion and being cantilevered therefrom.

According to another aspect of the invention, the support arrangement may further include a mounting flange welded to an inner surface of the first support rail and extending downward from the first support rail and at least one panel mount welded to an outer surface of the second support rail at a respective location along at least one of the horizontal portion of the second support rail and the angled portion of the second support rail. The mounting flange includes a first end disposed between the first and second ends of the horizontal portion of the first support rail, and a second end disposed between the first and second ends of the angled portion of the first support rail.

According to yet another embodiment of the invention, the support arrangement may include a first platform having a first portion welded to an inner surface of the first support rail at a location adjacent the second end of the angled portion of the first support rail and a second platform having a first portion welded to an inner surface of the second support rail at a location adjacent the second end of the angled portion of the second support rail. The first platform further includes a second portion extending inward from the first portion and being cantilevered from the first support rail. Similarly, the second platform further includes a second portion extending inward from the first portion and being cantilevered from the second support rail. The horizontal platform is coupled to the second portions of the first and second platform mounts.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
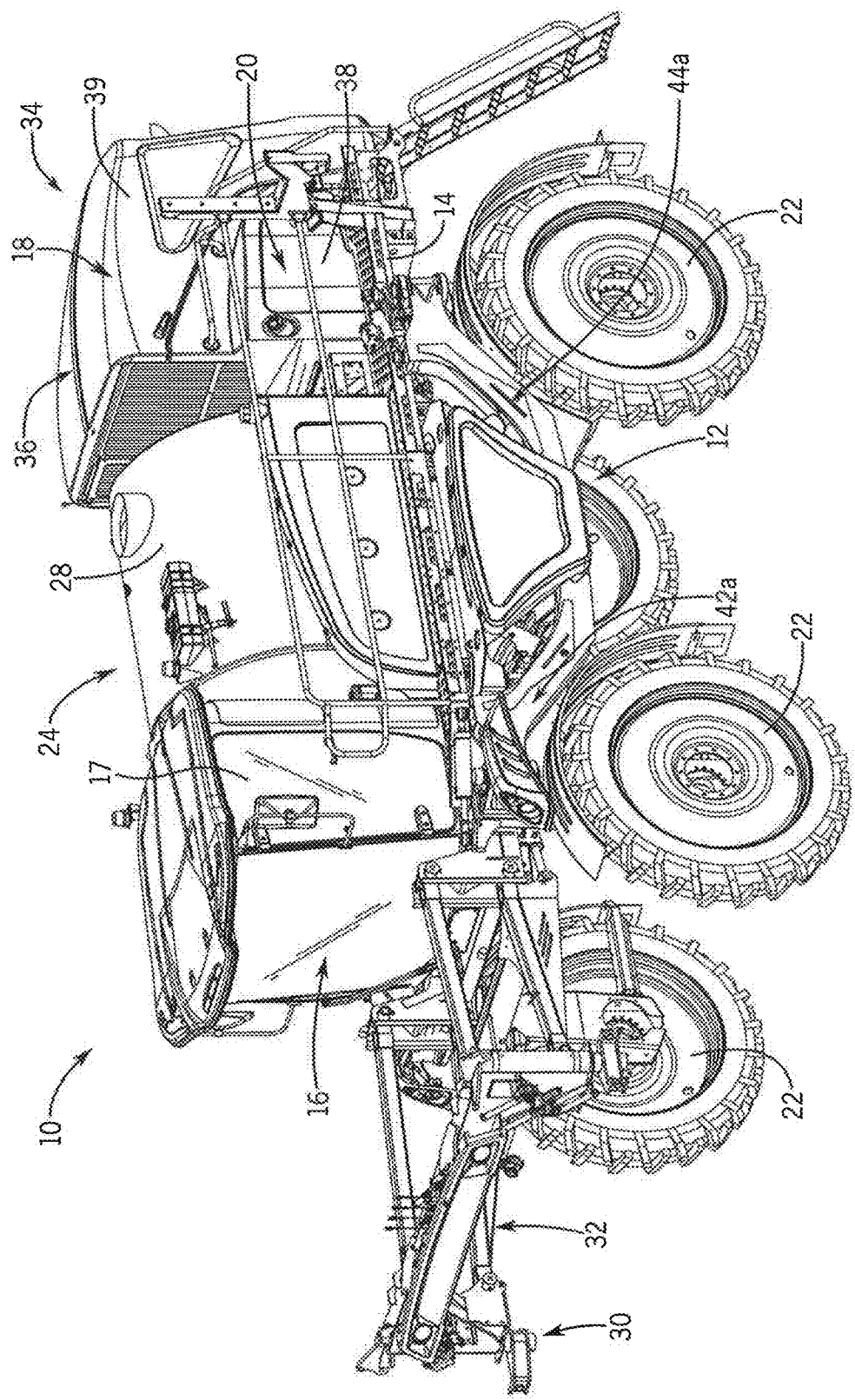
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

The engine 18 and the engine accessory system 34 are housed within an engine compartment 36. As shown in FIG. 1, the engine compartment 36 is enclosed by side panels 38, an engine hood 39, and a door system 41. In addition, a support arrangement 40 is coupled to the chassis frame 14 and disposed within the engine compartment 36 to provide support for the engine 18 and the engine accessory system 34.

Figure 2:
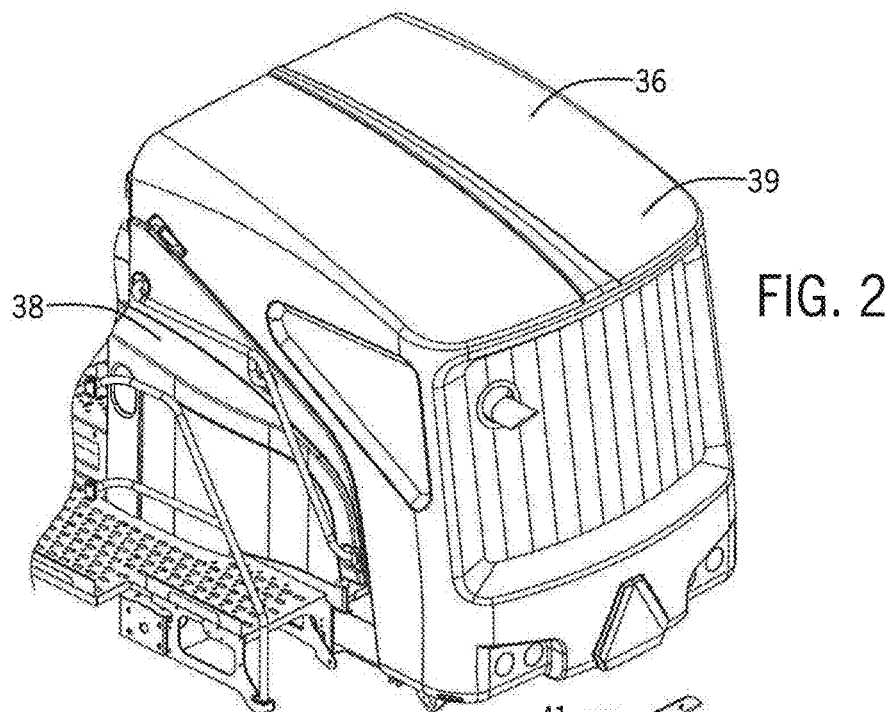
FIG. 2 is an isometric view of an engine compartment of the agricultural machine of FIG. 1, according to an embodiment of the invention.

FIG. 2 illustrates a rear isometric view of the engine compartment 36 of the sprayer 10 with the engine hood 39 in a closed position in order to provide context for the following figures.

Figure 3:
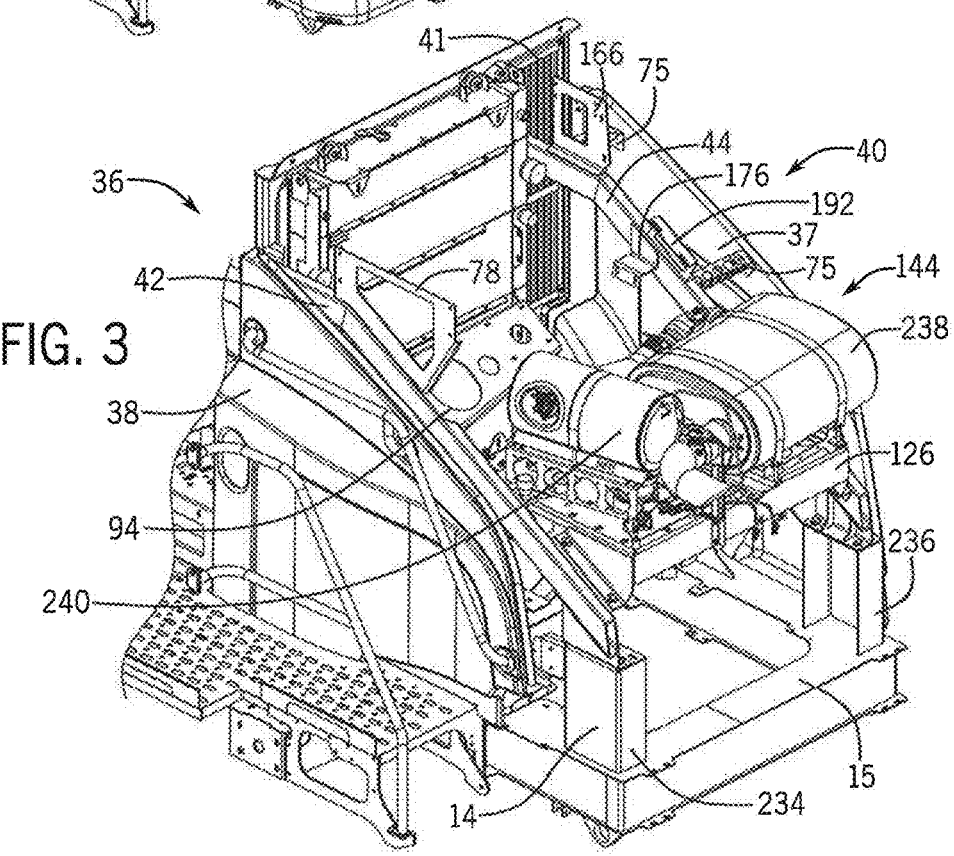
FIGS. 3 and 4 are isometric views of the engine compartment of FIG. 2 with an engine hood removed to depict a support arrangement within the engine compartment, according to an embodiment of the invention.
Figure 4:
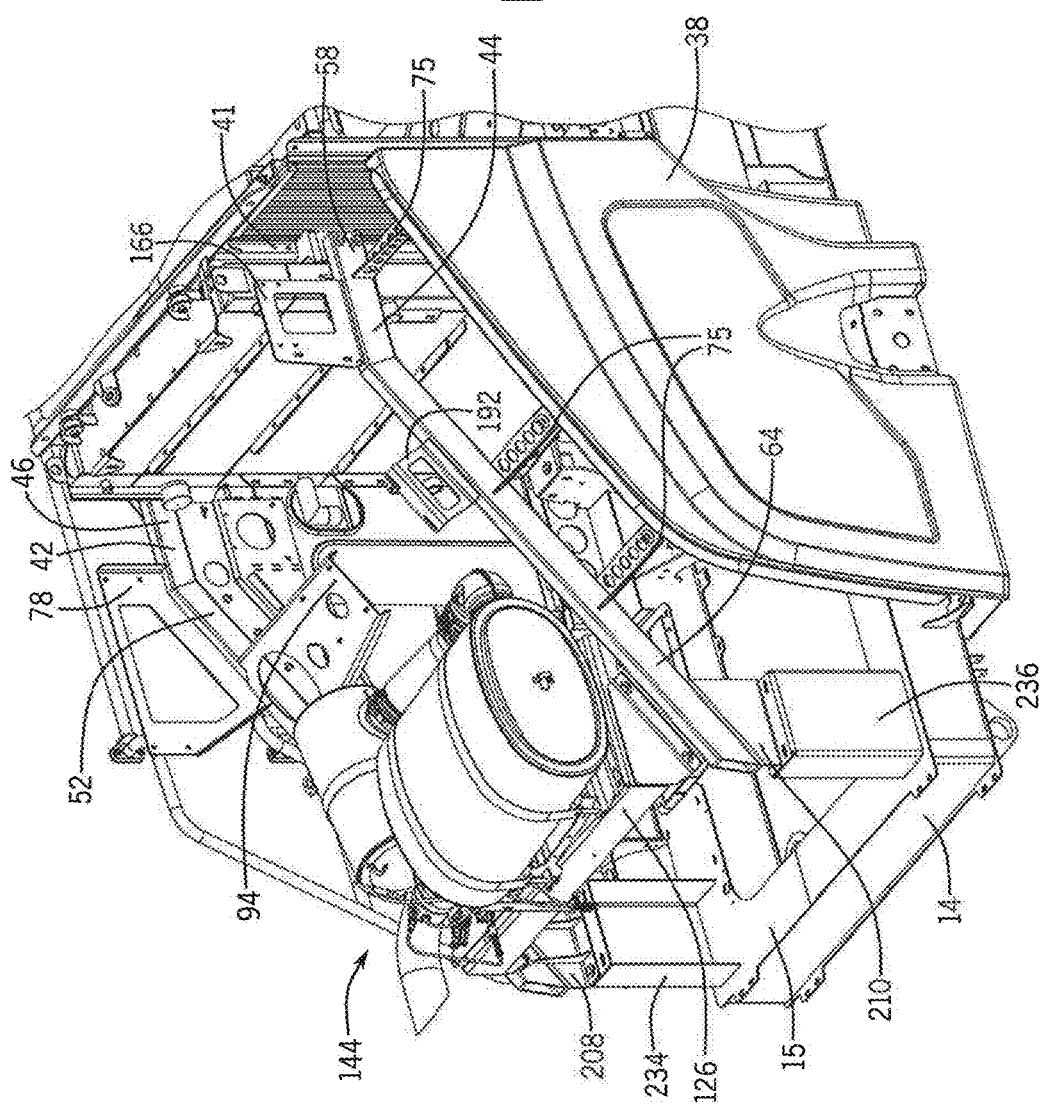
Figure 5:
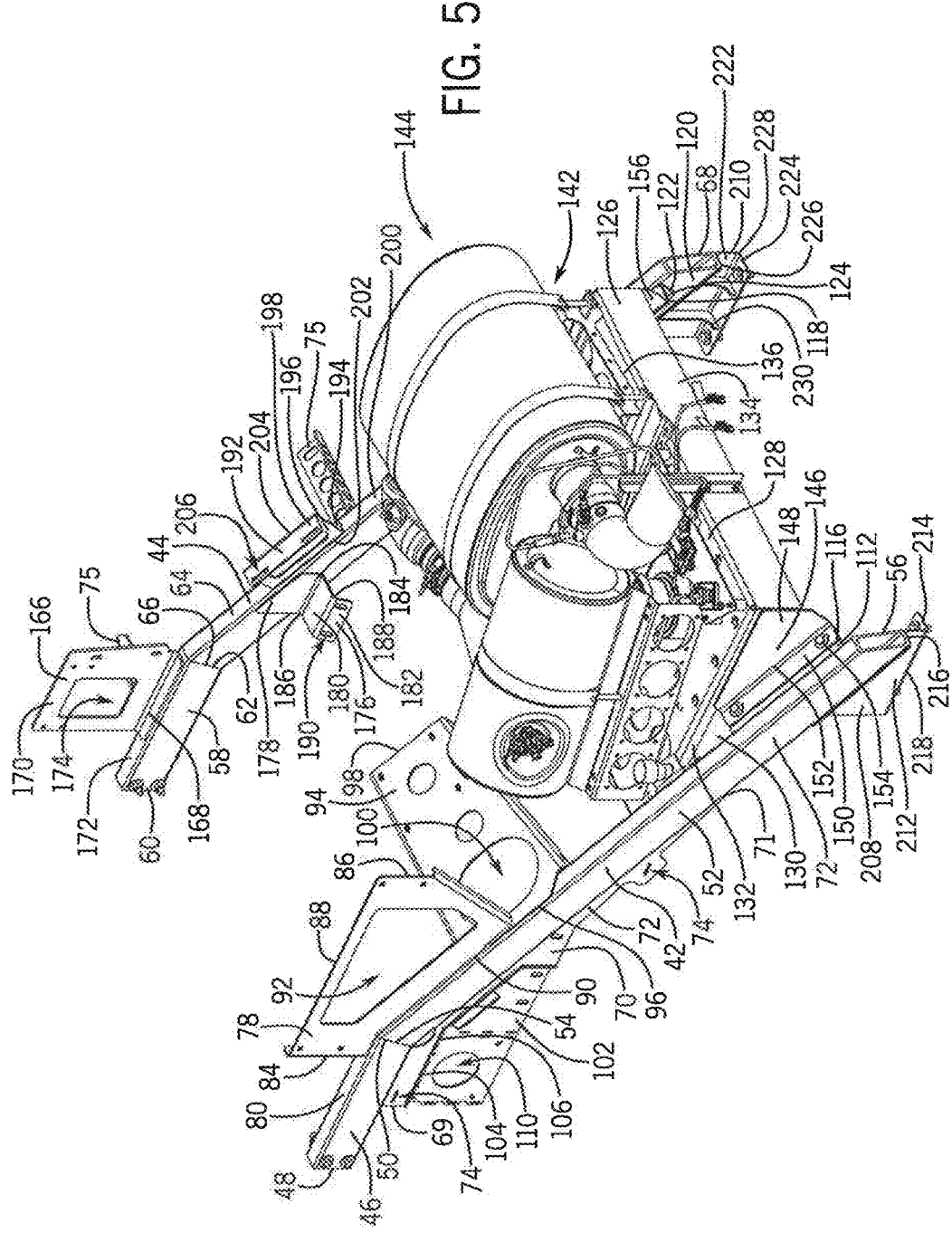
FIGS. 5 and 6 are isometric views of the support arrangement removed from the engine compartment, according to an embodiment of the invention.
Figure 6:
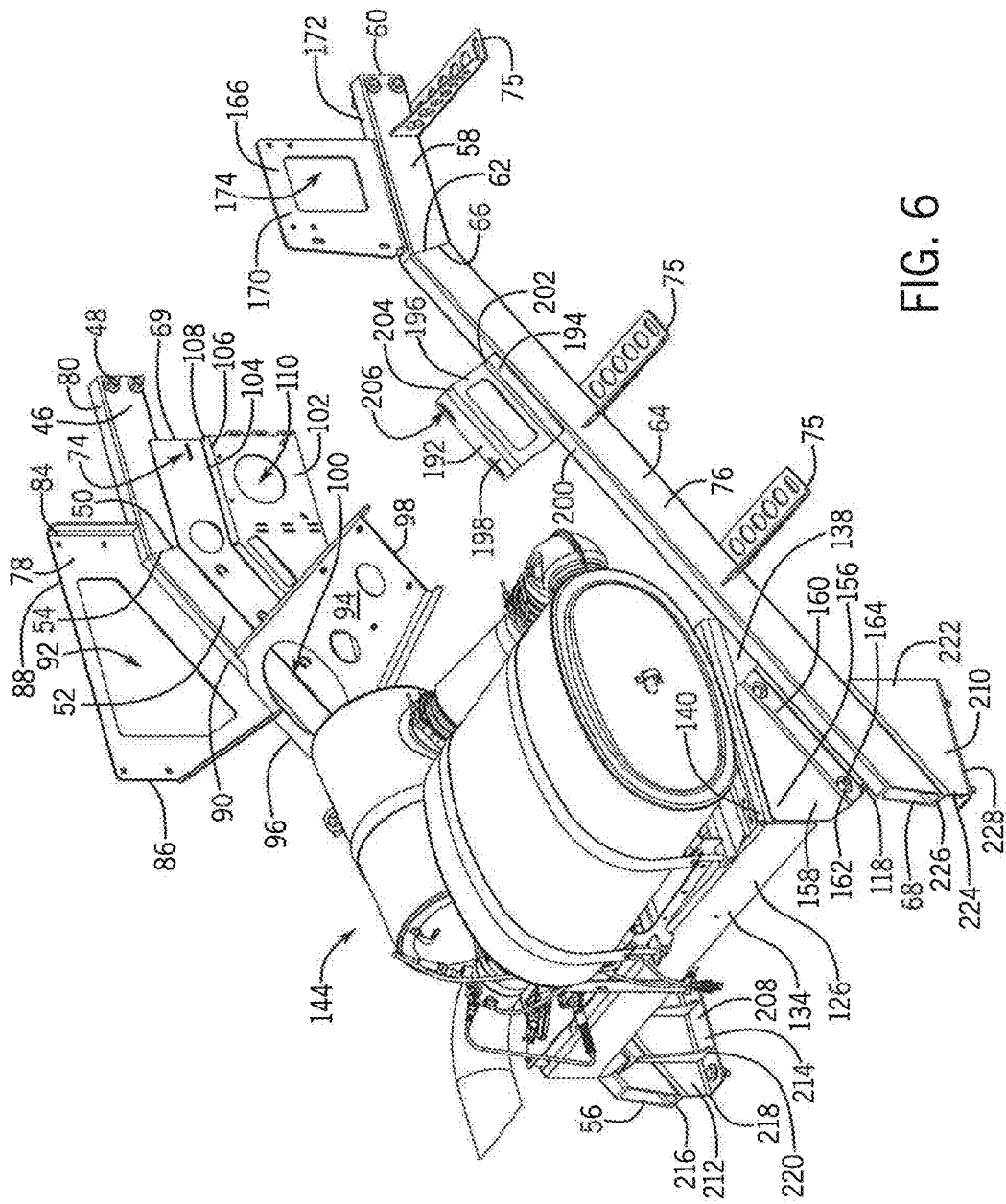
Figure 7:
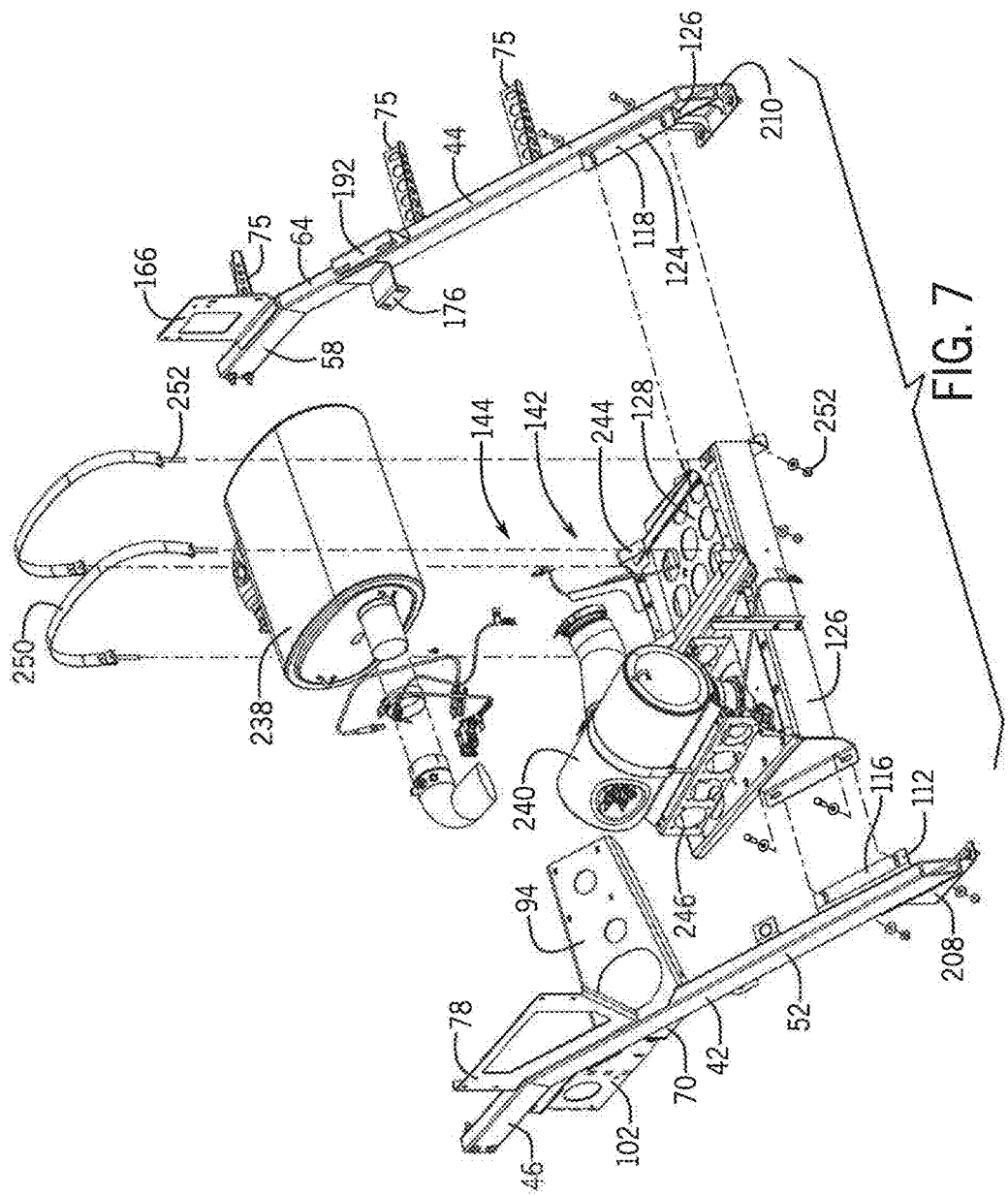
FIG. 7 is an exploded isometric view of the support arrangement removed from the engine compartment, according to an embodiment of the invention.

Next, FIGS. 3 and 4 depict isometric views of the support arrangement 40 within the engine compartment 36 of the sprayer with the engine hood 39 removed, FIGS. 5 and 6 depict isometric views of the support arrangement 40 removed from the engine compartment 36, and FIG. 7 depicts an exploded isometric view of the support arrangement 40. The support arrangement 40 includes a first support rail 42 and a second support rail 44. The first and second support rails 42, 44 are spaced apart from each other at opposite sides of the engine compartment 36. The first support rail 42 includes a horizontal portion 46 having a first end 48 and a second end 50 and an angled portion 52 having a first end 54 and a second end 56. The angled portion 52 extends from the second end 50 of the horizontal portion 46 at a downward angle between 0 and 90 degrees. Similarly, the second support rail 44 includes a horizontal portion 58 having a first end 60 and a second end 62 and an angled portion 64 having a first end 66 and a second end 68. The angled portion 64 extends from the second end 62 of the horizontal portion 58 at a downward angle between 0 and 90 degrees. Each of the first and second support rails 42, 44 are coupled to the chassis frame 14 within the engine compartment 36.

Both the first and second support rails 42, 44 includes a plurality of mounts coupled thereto. In the representative embodiment of the invention, each of the plurality of mounts described below is coupled to at least one of the first support rail 42 and the second support rail 44 by a fusion process, such as, but not limited to, welding.

As shown in FIGS. 4 and 5, the first support rail 42 includes a mounting flange 70 extending downward from the first support rail 42. The mounting flange 70 is coupled to an inner surface 43 of the first support rail 42 and extends downward at an angle parallel to the inner surface 43 of the first support rail 42. A first end 69 of the mounting flange 70 is disposed between the first and second ends 48, 50 of the horizontal portion 46 of the first support rail 42. A second end 71 of the mounting flange 70 is disposed between the first and second ends 56, 58 of the angled portion 52 of the first support rail 42. In the representative embodiment of the invention, the mounting flange 70 is illustrated as having a horizontal portion 75 and an angled portion 77 adjacent the respective horizontal and angled portions 46, 52 of the first support rail 42.

The mounting flange 70 includes a plurality of mounting slots 72 disposed at locations on an outer surface 73 of the mounting flange 70 and formed therethrough. At least one of the plurality of mounting slots 72 is disposed along the angled portion 77 of the mounting flange 70. Further, more or less than one (1) of the plurality of mounting slots 72 may be disposed along the horizontal portion 75 of the mounting flange 70. While FIG. 4-6 illustrates the use of two (2) mounting slots 72, the mounting flange 70 may include more or less than two (2) mounting slots 72 in other embodiments of the invention. The mounting slots 72 are configured to interfit with a side panel 38 and allow for the side panel 38 to be releasably mounted to the first support rail 42.

The second support rail 44 includes at least one of panel mount 74 extending from respective locations on an outer surface 76 of the second support rail 44, as shown in FIGS. 3, 6, 7. In the representative embodiment of the invention, two (2) panel mounts 74 extend from the angled portion 64 of the second support rail 44 and one (1) panel mount 74 extends from the horizontal portion 58 of the second support rail 44. However, alternative embodiment of the invention may include any number of panel mounts 74 disposed along the angled portion 64 alone, the horizontal portion 58 alone, or both the angled portion 64 and the horizontal portion 58. The panel mounts 74 are configured to mount a side panel 38 to the second support rail 44 without allowing the releasability described above with respect to the mounting slots 70. As shown in FIG. 3, the panel mounts 74 may be coupled to mounting brackets 75 disposed on an interior surface 37 of the adjacent side panel 38.

While FIGS. 3-7 illustrates the first support rail 42 having mounting slots 70 and the second support rail 44 having panel mounts 74, it is contemplated that the first support rail 42 and the second support rail 44 may each have either mounting slots 70 or panel mounts 74 independent of each other.

The first support rail 42 may also include a de-aeration tank mount 78 coupled to a top surface 80 of the first support rail 42. The de-aeration tank mount 78 extends upward from the top surface 80 of the first support rail in a vertical direction. Further, the de-aeration tank mount 78 may be coupled to both the horizontal portion 46 and the angled portion 52 of the first support rail 42. That is, a first side 84 of the de-aeration tank mount 78 ends at a location between the first and second ends 48, 50 of the horizontal portion 46 of the first support rail 42, and a second side 86 of the de-aeration tank mount 78 ends at a location between the first and second ends 54, 56 of the angled portion 52 of the first support rail 42. The de-aeration tank mount 78 may also be oriented so that a top 88 of the de-aeration tank mount 78 is disposed above and parallel to the horizontal portion 46 of the first support rail 42, and a bottom 90 of the de-aeration tank mount 78 is coupled to and extends along the top surface 80 of the first support rail 42. Further, the de-aeration tank mount 78 may include at least one orifice 92 formed therein to facilitate mounting of a de-aeration tank (not shown) to the de-aeration tank mount 78 while also minimizing the weight of the de-aeration tank mount 78.

In addition, the first support rail 42 may include an air filter mount 94 coupled to the top surface 80 of the first support rail 42 at a first end 96 of the air filter mount 94. As a result, a second end 98 of the air filter mount 94 is then cantilevered out from first support rail 42. As shown in FIGS. 3-6, the air filter mount 94 extends inward from the first support rail 42 at an angle parallel to the top surface 80 of the first support rail 42. In alternative embodiments of the invention, the air filter mount 94 may extend from the inward from the first support rail 42 at any angle in relation to the top surface 80 of the first support rail 42. Further, the air filter mount 94 is located at a location between the first and second ends 54, 56 of the angled portion 52 of the first support rail 42. The air filter mount 94 includes a plurality of orifices 100 formed therein to facilitate mounting of an air filter (not shown) to the air filter mount 94 while also minimizing the weight of the air filter mount 94.

The first support rail 42 may also include a fuse panel mount 102 extending from a bottom edge 104 of the mounting flange 70. In some embodiments of the invention, a top edge 106 of the fuse panel mount 102 may be coupled to the bottom edge 104 of the mounting flange 70. In other embodiments of the invention, the fuse panel mount 102 may be integrated with the mounting flange 70. As shown in FIGS. 5 and 6, the fuse panel mount 102 may include an extension portion 108 configured to space the fuse panel mount 102 inward from the mounting flange 70. The extension portion 108 may be angled at any angle between vertical and horizontal. Further, the fuse panel mount 102 may include at least one orifice 110 formed therein to facilitate mounting of a fuse panel (not shown) to the fuse panel mount 102 while also minimizing the weight of the fuse panel mount 102.

The first support rail 42 may also include a first ATS platform mount 112 coupled to the inner surface 43 of the first support rail 42 at a location adjacent the second end 56 of the angled portion 52 of the first support rail 42. A first portion 114 of the ATS platform mount 112 is oriented parallel to and coupled to the inner surface 43 of the first support rail 42, and a second portion 116 of the ATS platform mount 112 is oriented parallel to the inner surface 43 of the first support rail and cantilevers out from the first support rail 42.

Similarly, the second support rail 44 may include a second ATS platform mount 118 coupled to an inner surface 120 of the second support rail 44 at a location adjacent the second end 68 of the angled portion 64 of the second support rail 44. A first portion 122 of the ATS platform mount 118 is oriented parallel to and coupled to the inner surface 120 of the second support rail 44, and a second portion 124 of the ATS platform mount 118 is oriented perpendicular to the inner surface 120, of the second support rail 44 and cantilevers out from the second support rail 44.

While the representative embodiment of the invention depicts the second portion 116 of the first ATS platform mount 112 as being oriented perpendicular to the inner surfaces 43 of the first support rail 42, it is contemplated that the second portion 116 of the first ATS platform mount 112 may be oriented at any angle with respect to the inner surface 43 of the first support rail 42. Similarly, it is contemplated that the second portion 124 of the second ATS platform mount 118 may be oriented at any angle with respect to the inner surface 120 of the second support rail 44.

An ATS platform 126 is coupled to the first and second ATS platform mounts 112, 118, and disposed between the first and second support rails 42, 44. In the representative embodiment of the invention, the ATS platform 126 includes a horizontal mounting surface 128, a first side 130 extending downward from a first edge 132 of the mounting surface 128, and second side 134 extending downward from a second edge 136 of the mounting surface 128, and a third side 138 extending downward from a third edge 140 of the mounting surface 128. While the representative embodiment of the invention depicts the ATS platform 126 having three sides (3) extending from three (3) edges, the ATS platform 126 may have any combination of numbers of edges and sides in other embodiments of the invention.

A plurality of ATS component mounts 142 are coupled to the horizontal mounting surface 128 of the ATS platform 126 in order to secure ATS components 144 to the ATS platform 126. The plurality of ATS component mounts 142 and the plurality of ATS components 144 will be described in further detail with respect to FIG. 8.

A first platform support 146 includes a first portion 148 and a second portion 150. The first portion 148 is oriented parallel to and coupled to the first side 130 of the ATS platform 126. The second portion 150 is oriented perpendicular to the first side 130 of the ATS platform 126 and cantilevers from a bottom edge 152 of the first portion 148. As shown in FIG. 5, the bottom edge 152 of the first portion 148 is oriented at an angle so that the second portion 150 of the first platform support 146 is oriented parallel to the second portion 116 of the first ATS mount 112 of the first support rail 42. The second portion 148 of the first platform support 146 and the second portion 116 is coupled to the second portion 116 of ATS mount 112 of the first support rail 42 by way of a plurality of fasteners 154.

Similarly, a second platform support 156 includes a first portion 158 and a second portion 160. The first portion 158 is oriented parallel to and coupled to the third side 138 of the ATS platform 116, the third side 138 being opposite the first side 130. The second portion 160 is oriented perpendicular to the second side 132 of the ATS platform 126 and cantilevers from a bottom edge 162 of the first portion 158. The bottom edge 162 of the first portion 158 is oriented so that the second portion 160 of the second platform support 156 is oriented parallel to the second portion 124 of the second ATS mount 118 of the second support rail 44. The second portion 160 of the second platform support 156 is coupled to the second portion 124 of the ATS mount 118 of the second rail 44 by way of a plurality of fasteners 142.

While the representative embodiment of the invention illustrates the use of fasteners 154, 164 to couple respective platform supports 146, 156 to respective ATS mounts 112, 118, other embodiments of the invention may use alternative means for mechanically coupling the platform mounts 120, 132 to the ATS platform mounts 102, 108, respectively.

The second support rail 44 may also include a radiator overflow mount 166 having a first portion 168 and a second portion 170. The first portion 168 of the radiator overflow mount 166 is oriented parallel to and coupled to a top surface 172 of the horizontal portion 58 of the second support rail 44 at any location between the first and second ends 60, 62 of the horizontal portion 58. The second portion 170 of the radiator overflow mount 166 extends upward from the top surface 172 of the horizontal portion 58 of the second support rail 44. In the representative embodiment of the invention, the second portion 170 of the radiator overflow mount 166 is oriented perpendicular to the top surface 172 of the horizontal portion 58. However, in alternative embodiments of the invention, the second portion 170 of the radiator overflow mount 166 may be oriented at any angle with respect to the top surface 172 of the horizontal portion 58. Further, the radiator overflow mount 166 may include at least one orifice 174 formed through the second portion 170 thereof to facilitate mounting of at least one of a radiator overflow bottle (not shown) and an air intake for the engine (not shown) to the radiator overflow mount 166 while also minimizing the weight of the radiator overflow mount 166.

The second support rail 44 may also include an air cooler mount 176 having a first portion 178, a second portion 180, and a third portion 182. The first portion 178 is oriented parallel to the inner surface 120 of the second support rail 44 and is coupled thereto at a location between the first and second ends 66, 68 of the angled portion 64 of the second support rail 44. The second portion 180 extends inward from a first end 184 aligned with a bottom edge 186 of the first portion 178 and to a second end 188 cantilevered therefrom. In the representative embodiment of the invention, the second portion 180 is oriented perpendicular to the first portion 178 and parallel to the to surface 172 of the horizontal portion 58 of the second support rail 44. In other embodiments of the invention, the second portion 180 may be oriented at any number of angles other than that shown in FIGS. 3-7. The third portion 182 extends downward from the second end 186 of the second portion 180 at any angle between 0 and 180 degrees. Further, the third portion 182 includes at least one orifice 190 formed therethrough to facilitate mounting of a charge air cooler tube (not shown) to the air cooler mount 176 while also minimizing the weight of the air cooler mount 176.

The second support rail 44 may also include a component mount 192 having a first portion 194, a second portion 196, and a third portion 198. The first portion 194 is oriented parallel to and coupled to a top surface 200 of the angled portion 64 of the second support rail 44 at a location between the first and second ends 66, 68 of the angled portion 64 of the second support rail 44. The second portion 196 extends upward from the first portion 194 and from a first end 202 aligned with the first portion 194 to a second end 204. In the representative embodiment of the invention, the second portion 196 is oriented perpendicular to the first portion 194, but it may be oriented at any other angle with respect to the first portion 194 in other embodiments of the invention. The third portion 198 extends inward from the second end 204 of the second portion 196 and is cantilevered therefrom. While the representative embodiment of the invention depicts the third portion 198 as being perpendicular to the second portion 196, it is contemplated that the third portion 198 may extend inward from the second end 204 of the second portion 196 at any angle. The second support rail 44 further includes a number of orifices 206 formed through the third and second portions 196, 198 to facilitate mounting of a component (not shown) within the engine compartment 36 to the component mount 192 while also minimizing the weight of the component mount 192.

As shown in FIGS. 3-7, both the first and second support rails 42, 44 include chassis mounts 208, 210, respectively. Chassis mounts 208, 210 are configured to couple the support arrangement 40 to the chassis frame 14. The first chassis mount 208 includes a first portion 212 and a second portion 214. The first portion 212 is coupled to and extends downward from a bottom surface 216 of the angled portion 52 of the first support rail 42 adjacent the second end 56 of the angled portion 52. The first portion 212 is aligned with the inner surface 43 of the first support rail 42. In other embodiments of the invention, the first portion 212 may be aligned with the inner surface 43 of the first support rail 42, the outer surface 72 of the first support rail 42, or any location in between. The second portion 214 of the first chassis mount 208 extends inward from a bottom edge 218 of the first portion 212 at an angle perpendicular to the first portion 212. In other embodiments of the invention, the second portion 214 may extend from the first portion 212 at any location and at any angle. The chassis mount 208 also includes at least one rib 220 extending upward from the second portion 214 and along the first portion 212. The at least one rib 220 is configured to supply additional strength to the support arrangement 40.

Similarly, the second chassis mount 210 includes a first portion 222 and a second portion 224. The first portion 222 is coupled to and extends downward from a bottom surface 226 of the angled portion 64 of the second support rail 44 at a location adjacent the second end 68 of the angled portion 64. In the representative embodiment of the invention, the first portion 222 is aligned with the outer surface 76 of the second support rail 44. In alternative embodiments of the invention, the first portion 22 may be aligned with the outer surface 76 of the second support rail 44, the inner surface 120 of the second support rail 44, or any location in between. The second portion 224 of the second chassis mount 210 extends inward from a bottom edge 228 of the first portion 222. While the representative embodiment of the invention depicts the second portion 224 as extending inward from the bottom edge 228 at an angle perpendicular to the first portion 222, it is contemplated that the second portion 224 may extend from the first portion 222 at any location and at any angle. The chassis mount 210 also includes at least one rib 230 extending upward from the second portion 224 and along the first portion 222 to provide additional strength to the support arrangement 40.

While the representative embodiment of the invention illustrates the use of two (2) ribs 220 and two (2) ribs 230, other embodiments of the invention may use more or less than two (2) ribs 220 and more or less than two (2) ribs 230. Further, the number of ribs 220 is independent from the number of ribs 230.

As shown in FIGS. 3 and 4, the second portions 212, 222 of the chassis mounts 208, 210, respectively, are each coupled to the chassis frame 14 by way of at least one fastener 232. In some embodiments of the invention, the chassis mounts 208, 210 may be coupled to first and second raised members 234, 236, respectively, extending upward from a top surface 15 of the chassis frame 14. In other embodiments of the invention, the chassis mounts 208, 210 may be coupled directly to the top surface 15 of the chassis frame 14.

As further illustrated in FIGS. 3 and 4, the horizontal portions 46, 58 of the first and second support rails 42, 44, respectively, are coupled to the door system 41 at locations adjacent the radiator at the front of the engine compartment 36.

While the variety of mounts described above are described as having a certain number of portions per each mount, it is contemplated that in other embodiments of the invention each mount may include more or less than the number of sections described above.

In addition, while the plurality of engine accessory mounts are described above as de-aeration mount 78, air filter mount 94, fuse panel mount 102, radiator overflow mount 166, air cooler mount 176, and component mount 192, each may be used to mount engine accessories other than those specifically mentioned by name. As such, the above engine accessory mounts may be referred to as first, second, third, fourth, fifth, and sixth engine accessory mounts. Alternatively, the above engine accessory mounts may be referred to as first, second, and third engine accessory mounts of the first support rail and first, second, and third engine accessory mounts of the second support rail.

Figure 8:
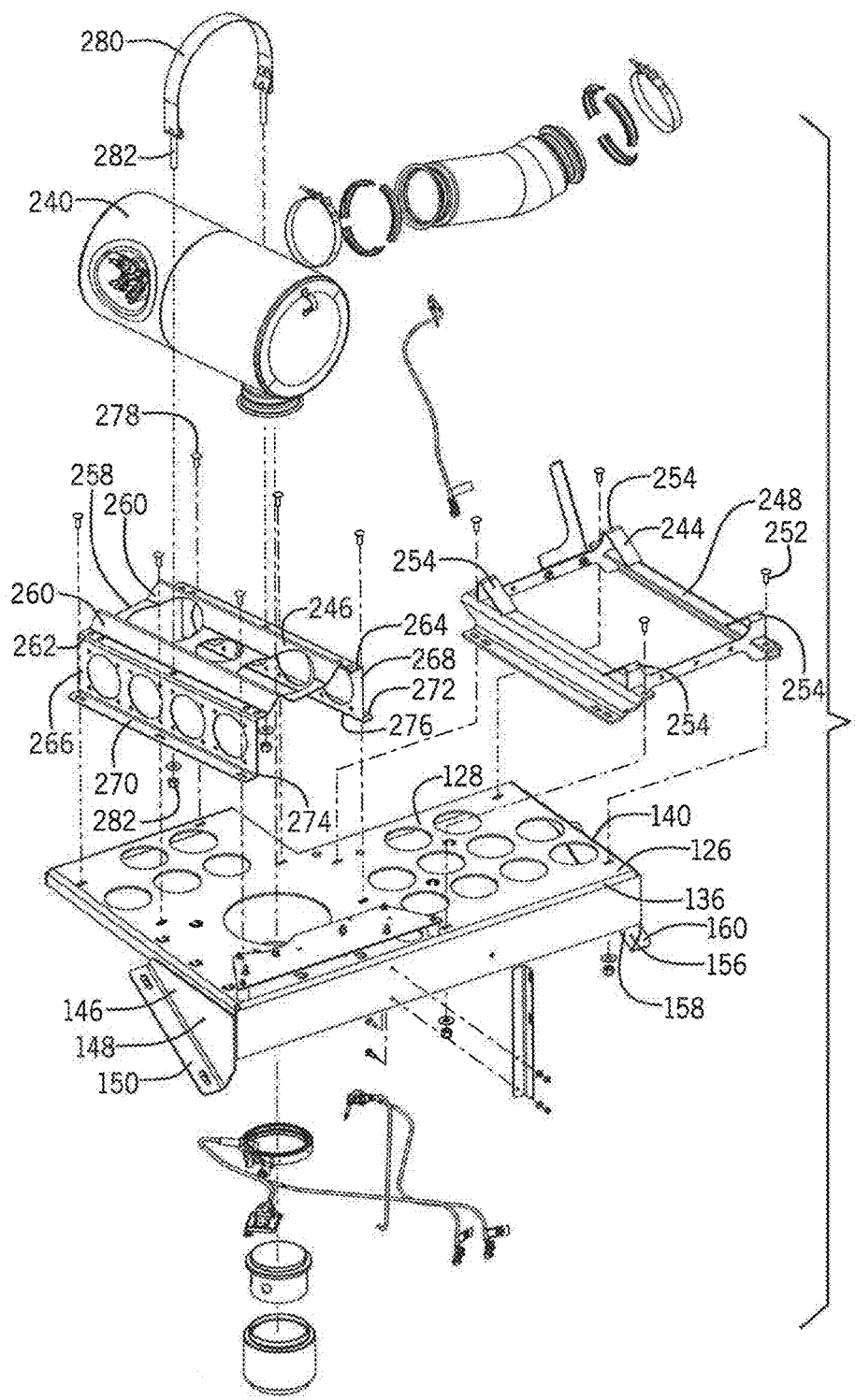
FIG. 8 is an exploded isometric view of the ATS platform mount, according to an embodiment of the invention.

Now referring to FIG. 8, an exploded isometric view of the ATS platform 126, ATS component mounts 142, and ATS components 144 are shown, according to an embodiment of the invention. The ATS components may include, but are not limited to, a muffler 238 and a catalytic converter 240. In turn, the ATS component mounts 142 may include, but are not limited to, a muffler mount 244 and a catalytic converter mount 246.

As shown in FIG. 8, the muffler mount 244 comprises a frame 248 and a plurality of bands 250 (seen in FIG. 7). The frame 248 is coupled to the mounting surface 128 of the ATS platform 126 adjacent the second and third edges 136, 140 of the mounting surface 128 by way of a plurality of fasteners 252. The muffler 238 is configured to sit within the frame 248 and be partially surrounded by raised brackets 254 of the frame 248. Additionally, the plurality of bands 250 surround the muffler 238 and secure the muffler 238 to the muffler mount 244. Each band 250 is coupled to the frame 248 by way of a plurality of fasteners 256.

The catalytic converter mount 246 comprises a main portion 258 upon which the catalytic converter 240 is configured to sit. The main portion 258 includes raised portions 260 configured to partially surround the catalytic converter 240. The main portion 258 includes a first side 262 and a second side 264, which is opposite the first side 262. A first extension portion 266 extends downward from the first side 262, and a second extension portion 268 extends downward from the second side 264. The extension portions 266, 268 are configured to raise the main portion 258 of the catalytic converter mount 246 in order to space the main portion 258 and the catalytic converter 240 resting upon it from the mounting surface 128 of the ATS platform 126. First and second mounting flanges 270, 272 extend from the bottom edges 274, 276 of the first and second extension portions 266, 268, respectively. The mounting flanges 270, 272 are coupled to the mounting surface 128 of the ATS platform 126 by way of a plurality of fasteners 278. In addition, at least one band 280 may be used to further surround and secure the catalytic converter 240 to its mount 246. The band 280 is coupled to the mount 258 via a plurality of fasteners 282.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An engine compartment support arrangement for an agricultural machine comprising:
    a first support rail disposed within an engine compartment, the first support rail comprising:
        a horizontal portion having a first end and a second end, the first end aligned with a first end of the first support rail; and
        an angled portion having a first end and a second end, the first end aligned with the second end of the horizontal portion and the second end aligned with a second end of the first support rail;
    a second support rail disposed within the engine compartment and spaced apart from the first support rail, the second support rail comprising:
        a horizontal portion having a first end and a second end, the first end aligned with a first end of the second support rail; and
        an angled portion having a first end and a second end, the first end aligned with the second end of the horizontal portion and the second end aligned with a second end of the second support rail;
    a horizontal platform disposed between the first and second support rails and coupled thereto; and
    a plurality of engine accessory mounts welded to at least one of the first support rail and the second support rail;
    wherein the first support rail includes a mounting flange extending downward from an inner surface of the first support rail, the mounting flange having a first end disposed between the first and second ends of the horizontal portion of the first support rail and a second end disposed between the first and second ends of the angled portion of the first support rail; and
    wherein the second support rail includes at least one panel mount extending from an outer surface of the second support rail at a respective location along at least one of the horizontal portion of the second support rail and the angled portion of the second support rail.

2. The engine compartment support arrangement of claim 1 wherein the plurality of engine accessory mounts includes a fuse panel mount extending from a bottom edge of the mounting flange.

3. The engine compartment support arrangement of claim 1 wherein the plurality of engine accessory mounts includes a de-aeration tank mount welded to a top surface of the first support rail and extending upward therefrom, the de-aeration tank mount having a first side disposed between the first and second ends of the horizontal portion of the first support rail and a second side disposed between the first and second ends of the angled portion of the first support rail.

4. The engine compartment support arrangement of claim 1 wherein the plurality of engine accessory mounts includes an air filter mount welded to a top surface of the first support rail at a location between the first and second ends of the angled portion of the first support rail, wherein the air filter mount extends from a first end aligned with the first support rail and a second end cantilevered out therefrom.

5. The engine compartment support arrangement of claim 1 wherein the plurality of engine accessory mounts includes a radiator overflow mount having a first portion and a second portion, the first portion oriented parallel to and welded to a top surface of the horizontal portion of the second support rail at a location between the first and second ends of the horizontal portion of the second support rail, and the second portion extending upward from the top surface of the horizontal portion of the second support rail.

6. The engine compartment support arrangement of claim 1 wherein the plurality of engine accessory mounts includes an air cooler mount includes a plurality of portions, a first portion of the plurality of portions oriented parallel to and coupled to an inner surface of the second support rail at a location between the first and second ends of the angled portion of the second support rail, a second portion of the plurality of portions extending inward from a first end aligned with a bottom edge of the first portion to a second end cantilevered therefrom, and a third portion of the plurality of portions extending downward from the second end of the second portion.

7. The engine compartment support arrangement of claim 1 wherein the plurality of engine accessory mounts includes a component mount having a plurality of portions, a first portion of the plurality of portions oriented parallel to and coupled to a top surface of the angled portion of the second support rail at a location between the first and second ends of the angled portion of the second support rail, a second portion of the plurality portions extending upward from a first end aligned with the first portion to a second end, and a third portion of the plurality of portions extending inward from the second end of the second portion and being cantilevered therefrom.

8. The engine compartment support arrangement of claim 1 wherein the first support rail includes a first chassis mount, the first chassis mount comprising:
    a first portion coupled to and extending downward from a bottom surface of the angled portion of the first support rail at a location adjacent the second end of the angled portion;
    a second portion extending inward from a bottom edge of the first portion; and
    at least one rib extending upward from the second portion and along the first portion;
    wherein the second support rail includes a second chassis mount, the second chassis mount comprising:
    a first portion coupled to and extending downward from a bottom surface of the angled portion of the second support rail at a location adjacent the second end of the angled portion;
    a second portion extending inward from a bottom edge of the first portion; and
    at least one rib extending upward from the second portion and along the first portion; and
    wherein the first and second chassis mounts are coupled to a chassis frame.

9. The engine compartment support arrangement of claim 1 wherein the first support rail includes a first platform mount disposed along an inner surface of the first support rail at a location adjacent the second end of the angled portion of the first support rail, the first platform mount comprising:
    a first portion oriented parallel to and welded to the inner surface of the first support rail; and
    a second portion extending inward from the first portion and cantilevered from the first support rail;

wherein the second support rail includes a second platform mount disposed along an inner surface of the second support rail at a location adjacent the second end of the angled portion of the second support rail, the second platform mount comprising:
    a first portion oriented parallel to and welded to the inner surface of the second support rail; and
    a second portion extending inward from the first portion and cantilevered from the second support rail; and
wherein the horizontal platform is coupled to the second portions of the first and second platform mounts.

10. A method of manufacturing an engine compartment support arrangement for an agricultural machine, the method comprising:
    providing a first support rail, first support rail having:
        a first end and a second end;
        a horizontal portion having a first end aligned with the first end of the first support rail and a second end; and
        an angled portion having a first end aligned with the second end of the horizontal portion and a second end aligned with the second end of the first support rail;
    providing a second support rail, the second support rail having;
        a first end and a second end;
        a horizontal portion having a first end aligned with the first end of the second support rail and a second end; and
        an angled portion having a first end aligned with the second end of the horizontal portion and a second end aligned with the second end of the second support rail;
    disposing a platform between the first and second support rails at locations adjacent the second ends of the first and second support rails;
    welding a plurality of engine accessory mounts of the first support rail to the first support rail;
    welding a plurality of engine accessory mounts of the second support rail to the second support rail;
    welding a mounting flange to an inner surface of the first support rail, the mounting flange extending downward from the first support rail, the mounting flange having a first end disposed between the first and second ends of the horizontal portion of the first support rail, and the mounting flange having a second end disposed between the first and second ends of the angled portion of the first support rail; and
    welding at least one panel mount to an outer surface of the second support rail at a respective location along at least one of the horizontal portion of the second support rail and the angled portion of the second support rail.

11. The method of claim 10 wherein welding a plurality of engine accessory mounts of the first support rail includes:
    welding a first engine accessory mount to a top surface of the first support rail, wherein the first engine accessory mount extends upward from the top surface of the first support rail, has a first side disposed between the first and second ends of the horizontal portion of the first support rail, and has a second side disposed between the first and second ends of the angled portion of the first support rail;
    welding a second engine accessory mount to the top surface of the first support rail at a location between the first and second ends of the angled portion of the first support rail, wherein the second engine accessory mount extends from a first end aligned with the first support rail and a second end cantilevered out therefrom; and
    welding a mounting flange to an inner surface of the first support rail, the mounting flange including a third engine accessory mount extending from a bottom edge of the mounting flange.

12. The method of claim 10 wherein welding a plurality of engine accessory mounts of the second rail to the second support rail includes:
    welding a first portion of a first engine accessory mount to a top surface of the horizontal portion of the second support rail at a location between the first and second ends of the horizontal portion of the second support rail, wherein a second portion of the first engine accessory mount extends upward from the top surface of the horizontal portion of the second support rail;
    welding a first portion of a second engine accessory mount to an inner surface of the second support rail at a location between the first and second ends of the angled portion of the second support rail, wherein a second portion of the second engine accessory mount extends inward from a first end aligned with a bottom edge of the first portion to a second end cantilevered therefrom, and wherein a third portion of the engine accessory mount extends downward from the second end of the second portion; and
    welding a first portion of a third engine accessory mount to a top surface of the angled portion of the second support rail at a location between the first and second ends of the angled portion of the second support rail, wherein a second portion of the third engine accessory extends upward from a first end aligned with the first portion to a second end, and wherein a third portion of the third engine accessory extends inward from the second end of the second portion and being cantilevered therefrom.

13. The method of claim 10 wherein disposing a platform between the first and second support rails comprises:
    welding a first portion of a first platform mount to an inner surface of the first support rail at a location adjacent the second end of the angled portion of the first support rail, wherein a second portion of the first platform mount extends inward from the first portion and is cantilevered from the first support rail;
    welding a first portion of a second platform mount to an inner surface of the second support rail at a location adjacent the second end of the angled portion of the second support rail, wherein a second portion of the second platform mount extends inward from the first portion and is cantilevered from the second support rail;
    coupling the horizontal platform to the second portions of the first and second platform mounts.

14. A support arrangement for an engine compartment of an agricultural machine, the support arrangement comprising:
    a first support rail including:
        a first end and a second end;
        a horizontal portion having a first end aligned with the first end of the first support rail and a second end; and
        an angled portion having a first end aligned with the second end of the horizontal portion and a second end aligned with the second end of the first support rail;
    a second support rail including;
        a first end and a second end;

a horizontal portion having a first end aligned with the first end of the second support rail and a second end; and an angled portion having a first end aligned with the second end of the horizontal portion and a second end aligned with the second end of the second support rail;

a platform coupled to the first and second support rails at locations adjacent the second ends of the first and second support rails, wherein the platform is disposed between and configured to space apart the first and second support rails;

a plurality of engine accessory mounts of the first support rail welded to the first support rail; and a plurality of engine accessory mounts of the second support rail welded to the second support rail, wherein the plurality of engine accessory mounts of the first support rail includes;

a first engine accessory mount welded to a top surface of the first support rail, wherein the first engine accessory mount extends upward from the top surface of the first support rail, has a first side disposed between the first and second ends of the horizontal portion of the first support rail, and has a second side disposed between the first and second ends of the angled portion of the first support rail;

a second engine accessory mount welded to the top surface of the first support rail at a location between the first and second ends of the angled portion of the first support rail, wherein the second engine accessory mount extends from a first end aligned with the first support rail and a second end cantilevered out therefrom; and a third engine accessory mount extending from a bottom edge of a mounting flange, the mounting flange welded to an inner surface of the first support rail.

15. The support arrangement of claim 14 wherein the plurality of engine accessory mounts of the second support rail includes:

a first engine accessory mount having a first portion and a second portion, the first portion being welded to a top surface of the horizontal portion of the second support rail at a location between the first and second ends of the horizontal portion of the second support rail, and the second portion extending upward from the top surface of the horizontal portion of the second support rail;

a second engine accessory mount having a first portion, a second portion, and a third portion, the first portion being welded to an inner surface of the second support rail at a location between the first and second ends of the angled portion of the second support rail, the second portion extending inward from a first end aligned with a bottom edge of the first portion to a second end cantilevered therefrom, and the third portion extending downward from the second end of the second portion; and a third engine accessory mount having a first portion, a second portion, and a third portion, the first portion being welded to a top surface of the angled portion of the second support rail at a location between the first and second ends of the angled portion of the second support rail, the second portion extending upward from a first end aligned with the first portion to a second end, and the third portion extending inward from the second end of the second portion and being cantilevered therefrom.

16. The support arrangement of claim 14 further comprising:

a mounting flange welded to an inner surface of the first support rail and extending downward from the first support rail, the mounting flange including:

a first end disposed between the first and second ends of the horizontal portion of the first support rail;

a second end disposed between the first and second ends of the angled portion of the first support rail; and at least one panel mount welded to an outer surface of the second support rail at a respective location along at least one of the horizontal portion of the second support rail and the angled portion of the second support rail.

17. The support arrangement of claim 14 further comprising:

a first platform mount having a first portion and a second portion, the first portion being welded to an inner surface of the first support rail at a location adjacent the second end of the angled portion of the first support rail, and the second portion extending inward from the first portion and being cantilevered from the first support rail;

a second platform mount having a first portion and a second portion, the first portion being welded to an inner surface of the second support rail at a location adjacent the second end of the angled portion of the second support rail, and the second portion extending inward from the first portion and being cantilevered from the second support rail;

wherein the horizontal platform is coupled to the second portions of the first and second platform mounts.

* * * * *